(12) United States Patent
Stokes et al.

(10) Patent No.: US 7,348,993 B2
(45) Date of Patent: Mar. 25, 2008

(54) SYSTEM AND METHOD FOR OBTAINING ACCURATE IMAGE CONTENT

(75) Inventors: Michael Stokes, Eagle, ID (US); William M. Crow, Sequim, WA (US)

(73) Assignee: Microsoft Corporation, Redmond, WA (US)

( * ) Notice: Subject to any disclaimer, the term of this patent is extended or adjusted under 35 U.S.C. 154(b) by 780 days.

(21) Appl. No.: 10/703,448

(22) Filed: Nov. 10, 2003

(65) Prior Publication Data

US 2005/0099506 A1     May 12, 2005

(51) Int. Cl.
*G09G 5/02* (2006.01)
*G09G 5/36* (2006.01)
*G06K 9/00* (2006.01)
*H04N 1/46* (2006.01)
*H04N 9/73* (2006.01)
*G03F 3/08* (2006.01)
*H04N 9/64* (2006.01)
*H04N 5/16* (2006.01)

(52) U.S. Cl. .................. 345/589; 345/593; 345/600; 345/549; 348/223.1; 348/251; 348/268; 358/516; 358/518; 382/162; 382/167

(58) Field of Classification Search ........ 345/589–594, 345/597, 600–606, 618–619, 653, 660, 661, 345/520, 522, 549; 358/515–520, 523, 527, 358/528, 530; 348/223.1, 225.1, 231.99, 348/234, 237, 251, 268; 382/162, 167
See application file for complete search history.

(56) References Cited

U.S. PATENT DOCUMENTS 5,850,472 A * 12/1998 Alston et al. ............... 382/162

(Continued)

OTHER PUBLICATIONS

Martinez-Verdú, Francisco, et al., "Characterization of a digital camera as an absolute tristimulus colorimeter", Color Imaging VIII: Processing, Hardcopy, and Applications, Reiner Eschbach, Gabriel G. Marcu, Editors, Proceedings of SPIE-IS&T Electronic Imaging, SPIE vol. 5008 (2003), pp. 197-208.
Hiroaki, Kotera, "Generation of Virtual Spectral Color Target and Application to Testing Input Devices", Journal of Imaging Science and Technology, vol. 45, No. 4, Jul./Aug. 2001, pp. 373-383.

(Continued)

*Primary Examiner*—Wesner Sajous
(74) *Attorney, Agent, or Firm*—Birch, Stewart, Kolasch & Birch, LLP (57) ABSTRACT

A method and system for allowing a computer system platform the ability to create image content is provided. Captured image data of an original image is received and information corresponding to colorimetric points is measured. Automatic determinations are made as to whether information of additional colorimetric points need to be measured to reproduce an accurate color representation of the original image. In response, the computer system platform can identify portions of a displayed image where information of colorimetric points needs to be measured. In addition, the system can automatically measure information of the additional colorimetric points needed. An image and color gamut representation are displayed allowing a user to manipulate measured information of colorimetric points and change the view of the color gamut representation, thereby allowing a user to create an accurate color representation of the original image.

27 Claims, 10 Drawing Sheets

U.S. PATENT DOCUMENTS

| | | |
|---|---|---|
| 6,452,593 B1 | 9/2002 | Challener |
| 6,455,835 B1 | 9/2002 | Bernardini et al. |
| 2002/0110372 A1* | 8/2002 | Fields .................. 396/225 |
| 2002/0145103 A1 | 10/2002 | Bernardini et al. |
| 2003/0090726 A1* | 5/2003 | Arai ..................... 358/2.1 |
| 2003/0193688 A1* | 10/2003 | Namikata ............. 358/1.15 |
| 2004/0012542 A1* | 1/2004 | Bowsher et al. ........ 345/10 |
| 2005/0057691 A1* | 3/2005 | Dean et al. ............ 348/552 |

OTHER PUBLICATIONS

Jones, Loyd A., and Condit, H. R., "Sunlight and Skylight as Determinants of Photographic Exposure, I., Luminous Density as Determined by Solar Altitude and Atmospheric Conditions," Journal of the Optical Society of America, vol. 38, No. 2, Feb. 1948, pp. 123-178.

Jones, Loyd A., and Condit, H.R., "Sunlight and Skylight as Determinants of Photographic Exposure. II. Scene Structure, Directional Index, Photographic Efficiency of Daylight, Safety Factors, and Evaluation of Camera Exposure", Journal of the Optical Society of America, vol. 39, No. 2, Feb. 1949, pp. 94-135.

\* cited by examiner

SYSTEM AND METHOD FOR OBTAINING ACCURATE IMAGE CONTENT

FIELD OF THE INVENTION

Aspects of the present invention are directed generally to color representation systems. More particularly, aspects of the present invention are directed to a system and method for automatic image content creation and color reference constructions for color input devices.

BACKGROUND OF THE INVENTION

Accurate color representation has become an increasing issue although the techniques used to create accurate, real world image content has not changed drastically in over fifty years. In 1947, Loyd A. Jones and H. R. Condit submitted a paper to the *Journal of the Optical Society of America*. Their paper, published in 1948, described the techniques that the two used in attempting to create a better image representation of tones and brightness when developing pictures in their laboratory. As part of their process, the two took a picture of a scene with a standard camera. Then they took black and white measurement values for certain areas or portions of the scene. Some of the measurement values were taken with an exposure meter and included information regarding the location of the measured value. They wrote down their results and took everything back to their laboratory for processing.

During development of the picture, the two learned that they could change tone reproduction to get a better representation of the scene. Based upon their measured values, they could correlate the developing image to specific densities for corresponding areas or portions. If a measurement was made of the luminance of the green color of the grass or the luminance of the blue color of the sky, processing of the image resulted in a closer representation of what the scene in the picture actually looked like when they took the picture. However, information was still calculated and interpolated based upon those measurements taken by Mr. Jones and Mr. Condit as well as perceived guesses as to the correct values for missing variables, such as the luminance of a shadow not measured.

With the prolific development of computer technology, more accurate cameras, color measurement devices, and computers have led to more sophisticated and robust processing systems. With digital cameras, liquid crystal displays, and inkjet printers getting wider gamuts for recording, displaying, and/or outputting image content, the need for obtaining reference imagery to test the different algorithms utilized in each device has become increasingly greater. Today, one can calibrate a digital camera for image representation; however, one cannot calibrate an image as a reference for subsequent calibration of a camera and/or other device.

With the boom of Internet-related business increasing daily, companies are eager to ensure that products and information are being accurately represented. Clothing manufacturers distribute millions of catalogs a year. Year after year, hundreds of millions of dollars are spent on clothes by consumers who never actually see the end product in person until it arrives at their door. However, the number one reason for product return has consistently been the fact that the color shown in the picture, whether in a magazine, on a billboard, on the Internet, or in a catalog did not match the color of the end product when it was received. Problems of inaccurate image content can lead to millions of lost dollars for companies and consumers alike.

Today, the manual process of tone reproduction and image content creation occurs after all measured values have been taken. If a photographer fails to take enough measurements of different colors from a scene, he/she will either be forced to guess at certain variables when processing the image content of the picture or he/she will have to attempt to recreate the exact setting that the image was taken. Either scenario leaves highly inaccurate results as guessed variables leave accuracy to the memory of the user and environmental conditions, such as the temperature, wind pattern, lighting, and other variable, may have changed.

Internal limitations of the camera restrict the accurate representation of image content. Although one can calibrate the camera, the image taken by the camera is never properly calibrated to an accurate representation of the scene. Therefore, the calibrated camera of today may take pictures for processing that operates according to its calibration; however, if the camera may always bias certain or all variables in a certain manner because of the inaccurate calibration. For example, a camera may be calibrated with a less saturated blue color. Any subsequent highly saturated blue color will be lost by the calibration of the camera.

SUMMARY OF THE INVENTION

There is therefore a need for an image content system that allows for creating image content as an accurate representation of the original image. An aspect of the present invention provides an architecture that receives captured image data, obtains information of colorimetric points from the original image, including color variables and location information, and determines whether additional information of colorimetric points are needed in order to create an accurate representation of the original image. Captured image data is transformed, taking into account the profile of the image capturing device, to an unbounded color space, such as scRGB, based on the obtained colorimetric points and/or input received from a user or an application.

Another aspect of the invention provides for display of an image, such as a thumbnail image, of the captured image data. Measured colorimetric points can be shown on the image and/or manipulated by a user and/or application. According to one aspect, colorimetric points can be resized or repositioned on the image. Another aspect of the invention provides for display of a color gamut representation of the measured colorimetric points in an easy to follow, three-dimensional form. The color gamut representation can be moved to a different view, such as a rotation of the three-dimensional representation. For the image and color gamut representation, both measured colorimetric points and colorimetric points needing to be measured can be displayed.

Another aspect of the invention provides for automatic measurement of all needed colorimetric points by the system. In still another aspect, an indication can be given to a user on the image to show a portion that needs an additional colorimetric point measured from the original image.

BRIEF DESCRIPTION OF THE DRAWINGS

The foregoing summary of the invention, as well as the following detailed description of illustrative embodiments, is better understood when read in conjunction with the accompanying drawings, which are included by way of example, and not by way of limitation with regard to the claimed invention.

DETAILED DESCRIPTION OF ILLUSTRATIVE EMBODIMENTS

In the following description of various illustrative embodiments, reference is made to the accompanying drawings, which form a part hereof, and in which is shown by way of illustration various embodiments in which the invention may be practiced. It is to be understood that other embodiments may be utilized and structural and functional modifications may be made without departing from the scope of the present invention.

Figure 1:
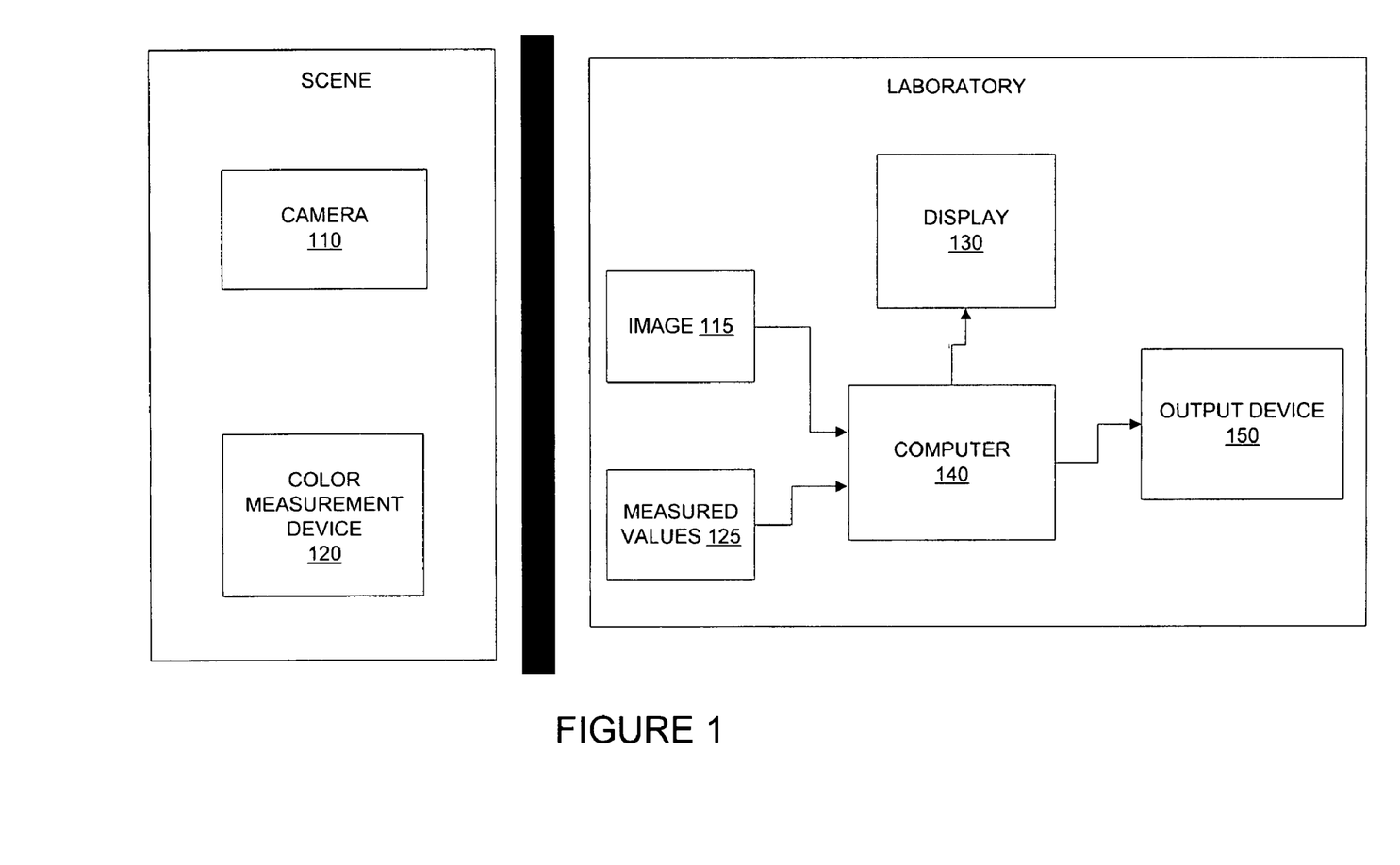
FIG. 1 is a block diagram of an image content solution including a camera, color measurement device, and computer.

FIG. 1 shows a block diagram of an image content solution. FIG. 1 shows a digital camera 110 and a color measurement device 120. For example, under the image content solution of FIG. 1, a user, such as a photographer, can take a picture of a scene with the digital camera 110 creating an image 115 in the camera. Having taken the picture of the scene, the user can use the color measurement device 120 to record color values for different spots in the scene. The color measurement device 120 will measure color information including color, hue, lightness, and saturation. The user can input the measured values 125 to a computer 140 in his/her lab for processing. The image 115 from the camera 110 is also inputted to the computer 140 for processing in the lab. Computer 140 is shown attached to a display 130 and output device 150. Display 130 can be used to review the image 115 during color processing. Output device 150 may include a printer to print out the image of the picture.

Image 115 and measured values 125 from the color measurement device 120 are processed by the computer 140 to correlate the image 115 to what the scene of the picture actually looked like. However, under the image content solution, the photographer has no accurate reference information. If the photographer did not obtain enough measured values 125, the resultant image content is inaccurate. Any missing variables of color measurements have to be remembered by the photographer to guess the appropriate appearance of the scene. Post-processing in a lab may take hours, days or longer. These gaps between when a photographer has taken a picture and when the image is processed to input guessed values creates inaccurate representations of the scene as it appeared.

Figure 2:
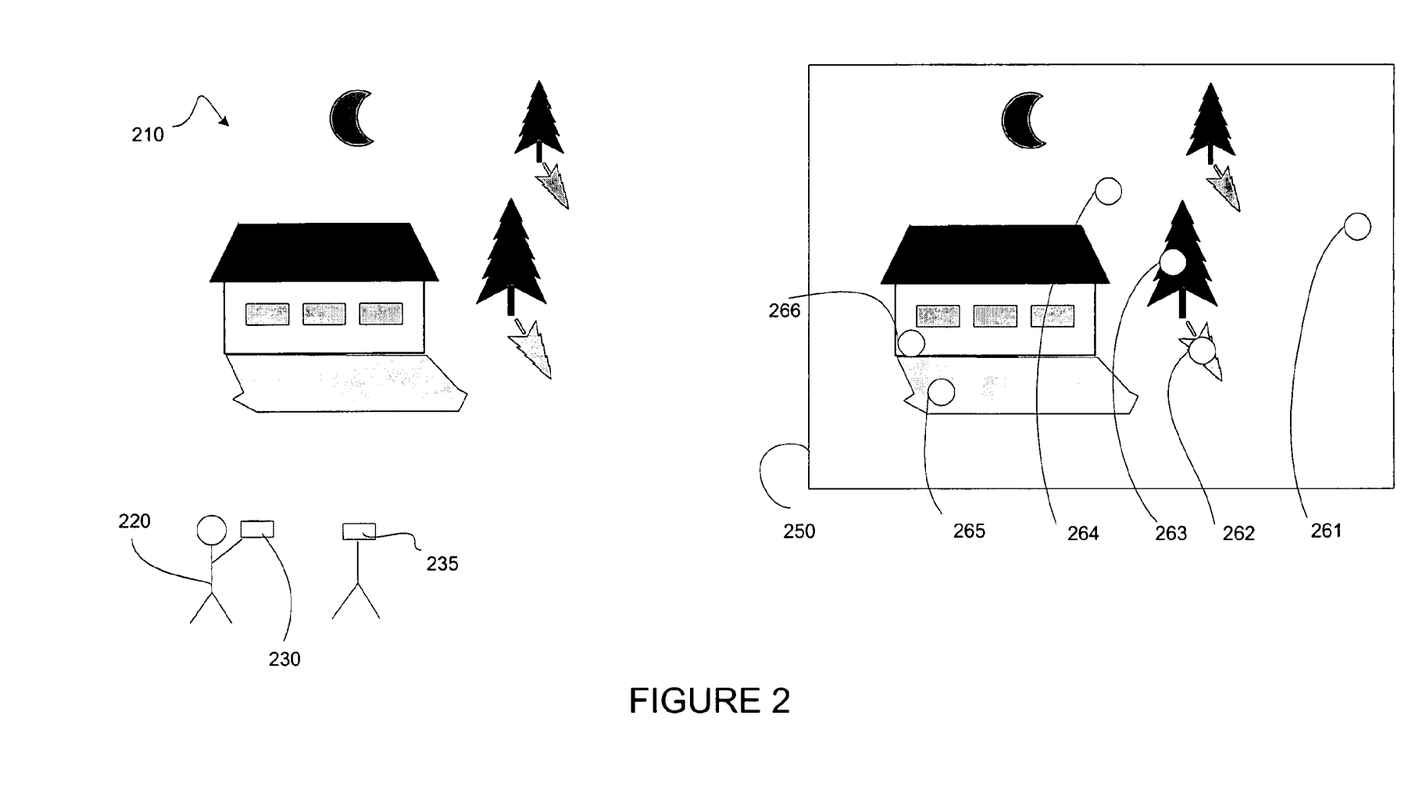
FIG. 2 is a diagram depicting operation of a camera and color measurement device.

FIG. 2 is a diagram depicting operation of a camera and color measurement device. As shown in FIG. 2, scene 210 depicts an outdoor setting, including a stream, a house, some trees, the night sky, shadows, and the moon. An individual 220 is shown taking a picture of the scene 210 with a camera 230. Further, colorimetric points are measured by color measurement device 235. For the scene 210, image 250 captured by the camera 230 is shown with points 261-266. Points 261-266 represent different points measured by the user 220 with the color measurement device 235. Color measurement device 235 may be a spectral radiometer that measures color and outputs specific wavelength data for each point measured. However, a user 220 must determine, at the time of taking the picture, how many points to measure and whether all necessary points for accurate processing in the lab have been measured. As shown in FIG. 2, user 220 has taken measurement points for six (6) measurements, 261-266. User 220 will manually measure and record the results for subsequent processing. If user 220 has not measured enough points to accurately reproduce the image to what it actually looked like, inaccurate image content will remain for subsequent pictures taken.

Figure 3:
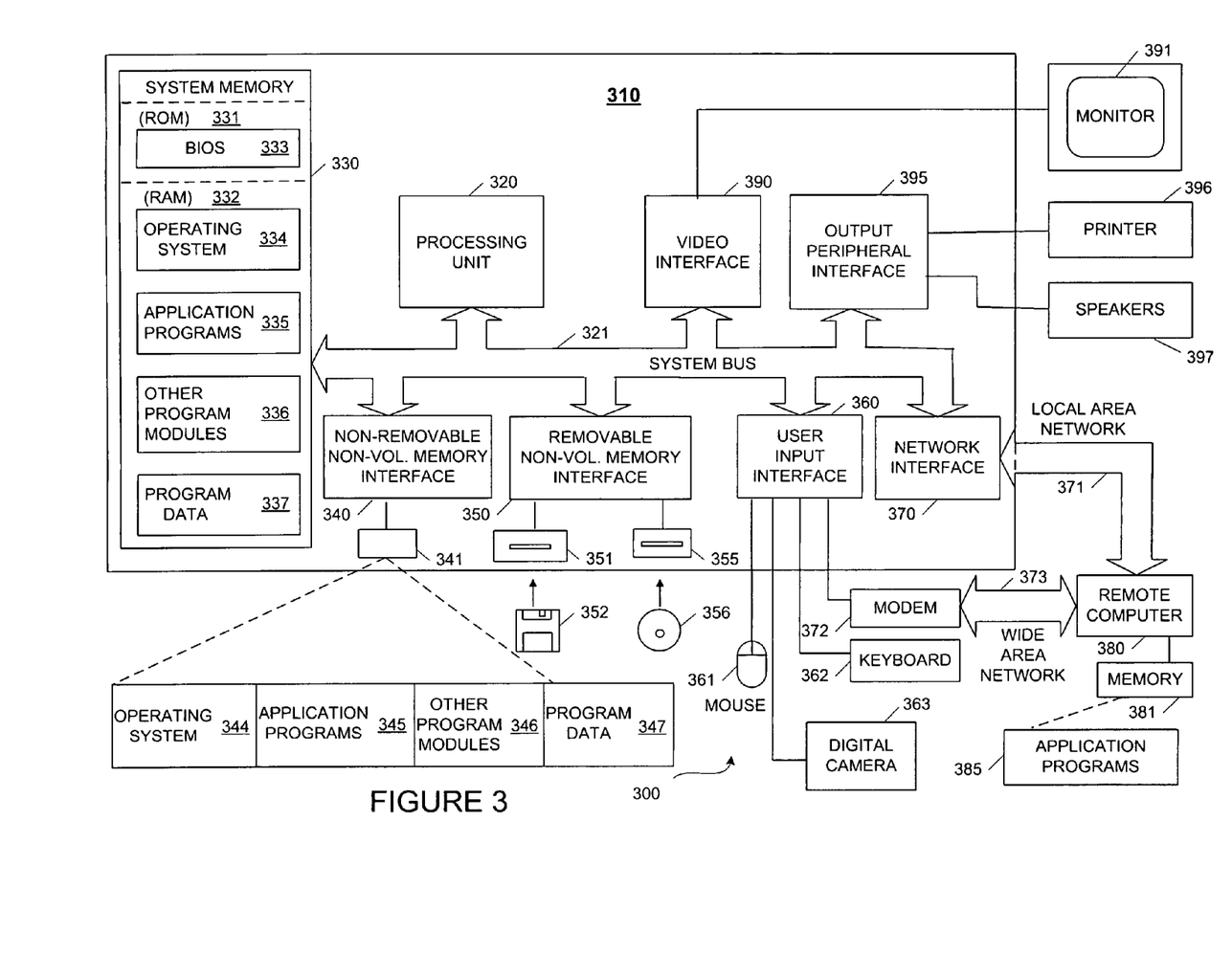
FIG. 3 illustrates a schematic diagram of a general-purpose digital computing environment in which certain aspects of the present invention may be implemented.

FIG. 3 illustrates an example of a suitable computing system environment 300 on which the invention may be implemented. The computing system environment 300 is only one example of a suitable computing environment and is not intended to suggest any limitation as to the scope of use or functionality of the invention. Neither should the computing system environment 300 be interpreted as having any dependency or requirement relating to any one or combination of components illustrated in the exemplary computing system environment 300.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 3, an exemplary system for implementing the invention includes a general-purpose computing device in the form of a computer 310. Components of computer 310 may include, but are not limited to, a processing unit 320, a system memory 330, and a system bus 321 that couples various system components including the system memory to the processing unit 320. The system bus 321 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 310 typically includes a variety of computer readable media. Computer readable media can be any available media that can be accessed by computer 310 and includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, random access memory (RAM), read only memory (ROM), electronically erasable programmable read only memory (EEPROM), flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 310. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 330 includes computer storage media in the form of volatile and/or nonvolatile memory such as ROM 331 and RAM 332. A basic input/output system 333 (BIOS), containing the basic routines that help to transfer information between elements within computer 310, such as during start-up, is typically stored in ROM 331. RAM 332 typically contains data and/or program modules that are immediately accessible to and/or presently being operated on by processing unit 320. By way of example, and not limitation, FIG. 3 illustrates operating system 334, application programs 335, other program modules 336, and program data 337.

The computer 310 may also include other removable/non-removable, volatile/nonvolatile computer storage media. By way of example only, FIG. 3 illustrates a hard disk drive 341 that reads from or writes to non-removable, nonvolatile magnetic media, a magnetic disk drive 351 that reads from or writes to a removable, nonvolatile magnetic disk 352, and an optical disk drive 355 that reads from or writes to a removable, nonvolatile optical disk 356 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 341 is typically connected to the system bus 321 through a non-removable memory interface such as interface 340, and magnetic disk drive 351 and optical disk drive 355 are typically connected to the system bus 321 by a removable memory interface, such as interface 350.

The drives and their associated computer storage media discussed above and illustrated in FIG. 3, provide storage of computer readable instructions, data structures, program modules and other data for the computer 310. In FIG. 3, for example, hard disk drive 341 is illustrated as storing operating system 344, application programs 345, other program modules 346, and program data 347. Note that these components can either be the same as or different from operating system 334, application programs 335, other program modules 336, and program data 337. Operating system 344, application programs 345, other program modules 346, and program data 347 are given different numbers here to illustrate that, at a minimum, they are different copies. A user may enter commands and information into the computer 310 through input devices such as a digital camera 363, a keyboard 362, and pointing device 361, commonly referred to as a mouse, trackball or touch pad. Other input devices (not shown) may include a microphone, joystick, game pad, satellite dish, scanner, or the like. These and other input devices are often connected to the processing unit 320 through a user input interface 360 that is coupled to the system bus 321, but may be connected by other interface and bus structures, such as a parallel port, game port or a universal serial bus (USB). A monitor 391 or other type of display device is also connected to the system bus 321 via an interface, such as a video interface 390. In addition to the monitor, computers may also include other peripheral output devices such as speakers 397 and printer 396, which may be connected through an output peripheral interface 395.

The computer 310 may operate in a networked environment using logical connections to one or more remote computers, such as a remote computer 380. The remote computer 380 may be a personal computer, a server, a router, a network PC, a peer device or other common network node, and typically includes many or all of the elements described above relative to the computer 310, although only a memory storage device 381 has been illustrated in FIG. 3. The logical connections depicted in FIG. 3 include a local area network (LAN) 371 and a wide area network (WAN) 373, but may also include other networks. Such networking environments are commonplace in offices, enterprise-wide computer networks, intranets and the Internet.

When used in a LAN networking environment, the computer 310 is connected to the LAN 371 through a network interface or adapter 370. When used in a WAN networking environment, the computer 310 typically includes a modem 372 or other means for establishing communications over the WAN 373, such as the Internet. The modem 372, which may be internal or external, may be connected to the system bus 321 via the user input interface 360, or other appropriate mechanism. In a networked environment, program modules depicted relative to the computer 310, or portions thereof, may be stored in the remote memory storage device. By way of example, and not limitation, FIG. 3 illustrates remote application programs 385 as residing on memory device 381. It will be appreciated that the network connections shown are exemplary and other means of establishing a communications link between the computers may be used.

It will be appreciated that the network connections shown are exemplary and other means of establishing a communications link between the computers can be used. The existence of any of various well-known protocols such as TCP/IP, Ethernet, FTP, HTTP and the like is presumed, and the system can be operated in a client-server configuration to permit a user to retrieve web pages from a web-based server. Any of various conventional web browsers can be used to display and manipulate data on web pages.

Figure 4:
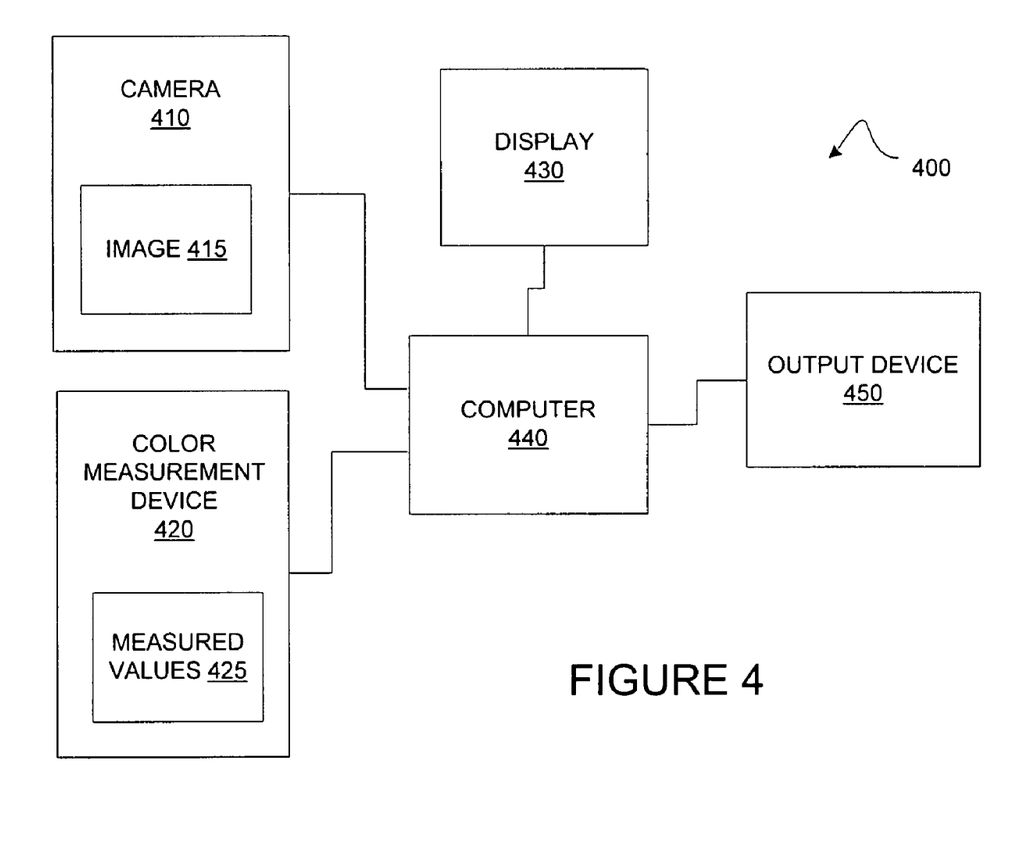
FIG. 4 illustrates a schematic diagram of an illustrative embodiment of an image content system in accordance with at least one aspect of the present invention.

Referring to FIG. 4, a schematic diagram of an image content system 400 in accordance with at least one aspect of the present invention is shown. It should be noted by those skilled in the art that the description of an image information capturing device is shown in FIG. 4 as a digital camera 410. This is but one type of image information capturing device. Other types of image information capturing devices include, but are not limited to, a scanner, a video frame grabber, a digital motion recorder, a digital camera that can record digital movies, and any other type of sensor that captures image information, whether as a still image or in a motion sequence. In FIG. 4, a digital camera 410, a color measurement device 420, a display 430, and an output device 450 are shown coupled to a computer 440. Color measurement device 420 may include a telescopic device, such as a tele-colorimeter or tele-spectroradiometer. Computer 440 may include a processing component. Output device 450 may be a printer. Under image content system 400, a user, such as a photographer, can take a picture of a scene with the digital camera 410 creating an image 415 in the camera.

Digital camera 410 captures a continuous luminance range in each of three color channels. In rendering the image, a determination is made as to what luminance value in the continuous luminance range represents "white" or the brightest reflected light source in the image. This is commonly referred to as the adopted white point. Any luminance information that is greater than the adopted white point value represents illuminant sources or direct reflections of light sources from non-diffuse surfaces, such as the glint off of a chrome bumper. These luminance values that are greater than the adopted white point are commonly referred to as spectral highlights. A particular luminance value that is the lowest luminance value that includes any useful information is commonly referred to as the adopted black point. The adopted white point, spectral highlights, and adopted black point are commonly determined by an algorithm built into the digital camera 410; however, they may be determined manually by a camera expert or professional. By specifying a luminance value that corresponds to a reference grey value, the function of the curve between the adopted black point and adopted white point can be described. These three points are used to fit a curve that describes the relationship between the measured luminance values and the desired luminance range. Further, through color filters and/or other techniques, digital camera 410 can take different luminance values for the same scene elements that represent different portions of the overall color spectrum. Most commonly, digital camera 410 measures luminance in the red spectrum, the green spectrum, and the blue spectrum. This combination of luminance values represents a color. Color data are camera-captured color values of scene elements with known source colors. Known source colors may be determined by a color measurement device.

Having taken the picture of the scene, the user and/or computer 440 can use the color measurement device 420 to record measured color values 425 for different points in the scene. The color measurement device 420 will measure color information including hue, lightness, and chroma or their absolute measurement equivalents of hue, brightness and colorfulness. Measured values 425 are inputted to computer 440 for processing. Image 415 from the camera 410 is also inputted to the computer 440 for processing. Image 415 may be stored as an image file within or external to computer 440. Measured values 425 may include color variable information and location information for each measured colorimetric point. Measured values 425 may be stored as metadata with the image file and/or stored as a separate file associated with the image file.

Image 415 and measured values 425 from the color measurement device 420 are processed by the computer 440 to correlate the image 415 to what the scene of the picture actually looks like. Under image content system 400, the user can accurately depict reference color content for the scene. As will be described below in reference to FIGS. 5 and 6A-6B, the user can accurately measure points and obtain all the necessary measurements automatically. The computer 440 can identify any missing points of color measurements and inform the user to obtain more measurements and/or automatically control the color measurement device 425 to obtain additional measurements. Further, captured image 415 may be transformed, taking into account the profile of camera 410, within computer 440 to an unbounded color space, such as scRGB, an industry-known, standard unbounded color space. Captured image 415 is transformed by computer 440, taking into account the profile of camera 410, based on measured values 425.

Guessed values by the user are removed as image content processing occurs immediately upon capture of the image 415 by camera 410. It should be understood by those skilled in the art that camera 410, color measurement device 420, display 430 and/or computer 440 may be contained within a single device or a combination of devices and is shown as three separate parts for illustration purposes in FIG. 4. For example, the color measurement device 420 may be housed within a common housing with camera 410. Further, the same housing could include a computer 440 and/or display 430. Positional information may be obtained by including a global positioning system and/or gyroscope within the color measurement device 420. Application programming interfaces may be employed to allow a camera 410 by a certain manufacturer to operate with an operating system of computer 440.

Figure 5:
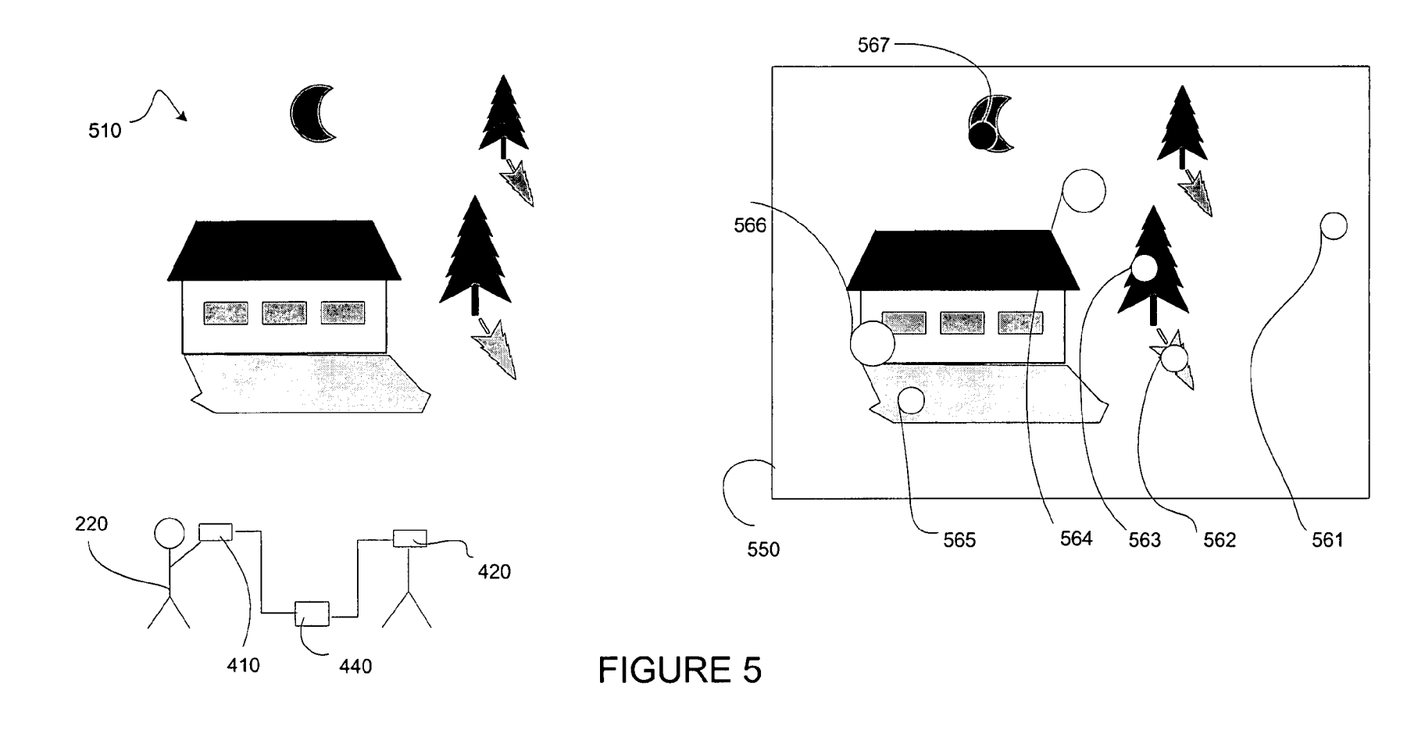
FIG. 5 is a diagram of an illustrative embodiment of operation of a camera and color measurement device in accordance with at least one aspect of the present invention.

FIG. 5 is a diagram depicting an illustrative embodiment of operation of a camera 410 and color measurement device 420 in accordance with at least one aspect of the present invention. As shown in FIG. 5, scene 510 depicts an outdoor setting, including a stream, a house, some trees, the night sky, shadows, and the moon. An individual 220 is shown taking a picture of the scene 510 with camera 410. Further, information of colorimetric points is measured by color measurement device 420. Camera 410 and color measurement device 420 are shown coupled to a computer 440. Measurements may be obtained automatically by computer 440 or may be taken by the user 220 and inputted into computer 440. Again, it should be understood that the camera 410, color measurement device 420, and computer 440 may be included within one or multiple devices.

For the scene 510, image 550 captured by the camera 410 is shown with points 561-566. Points 561-566 represent different points measured by the color measurement device 420. Color measurement device 420 may be a spectral radiometer that measures color and outputs specific wavelength data for each point measured. Because the processing of the image content occurs immediately, computer 440 determines how many points to obtain, which regions of the scene 510 should be measured, and whether all necessary points for accurate processing have been obtained. As shown in FIG. 5, measurement points for six (6) measurements, 561-566, have been taken and measurement point 567 has been identified by computer 440 as a point in which a measurement is needed. User 220 can measure the needed point and/or color measurement device 420 may automatically take and/or receive the needed measurement. Further measurements are taken until enough points to accurately reproduce the original image have been obtained.

Figure 6A:
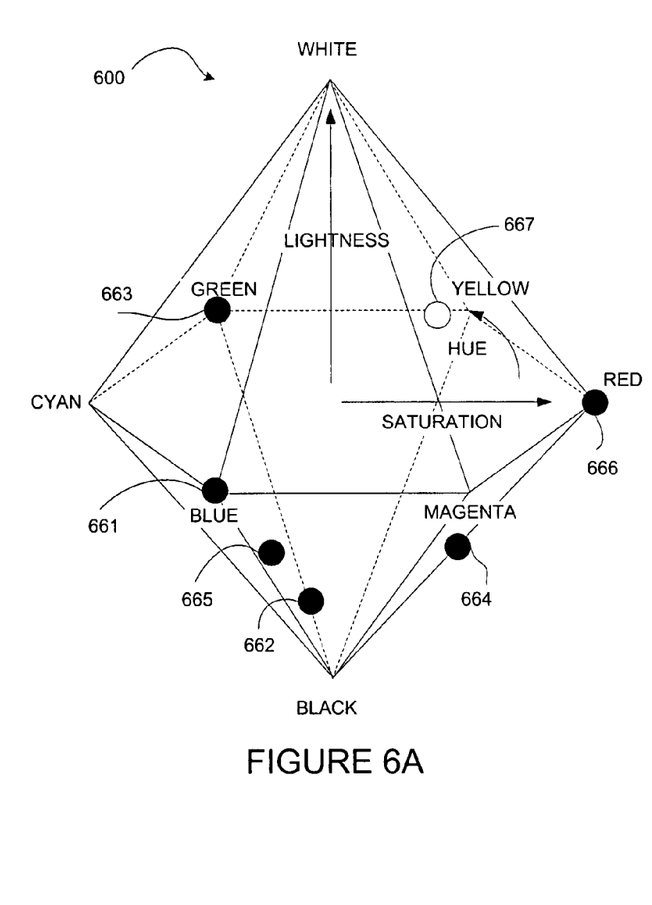
FIGS. 6A to 6C show a color gamut representation of all measurable colors in accordance with at least one aspect of the present invention.
Figure 6B:
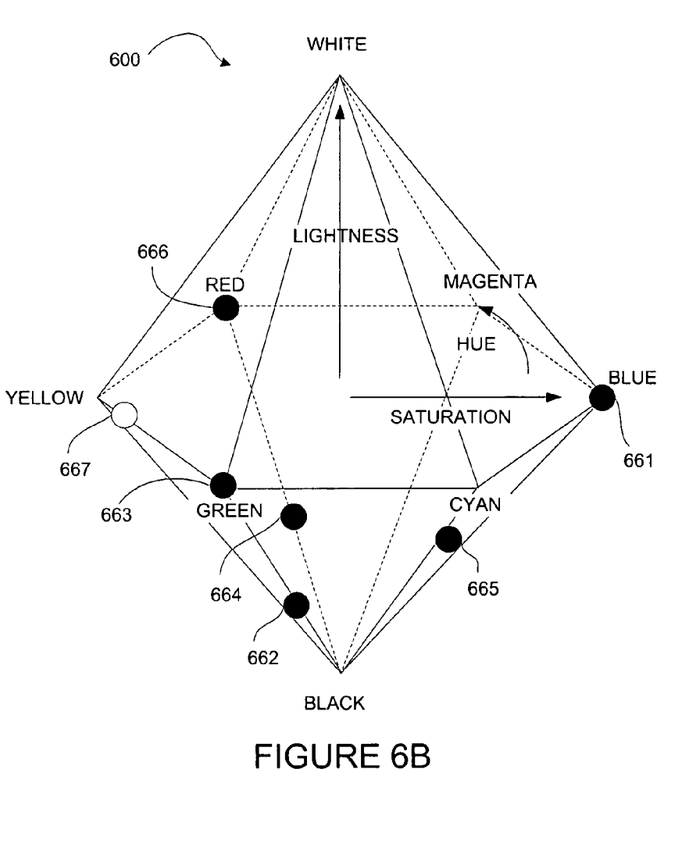
Figure 6C:
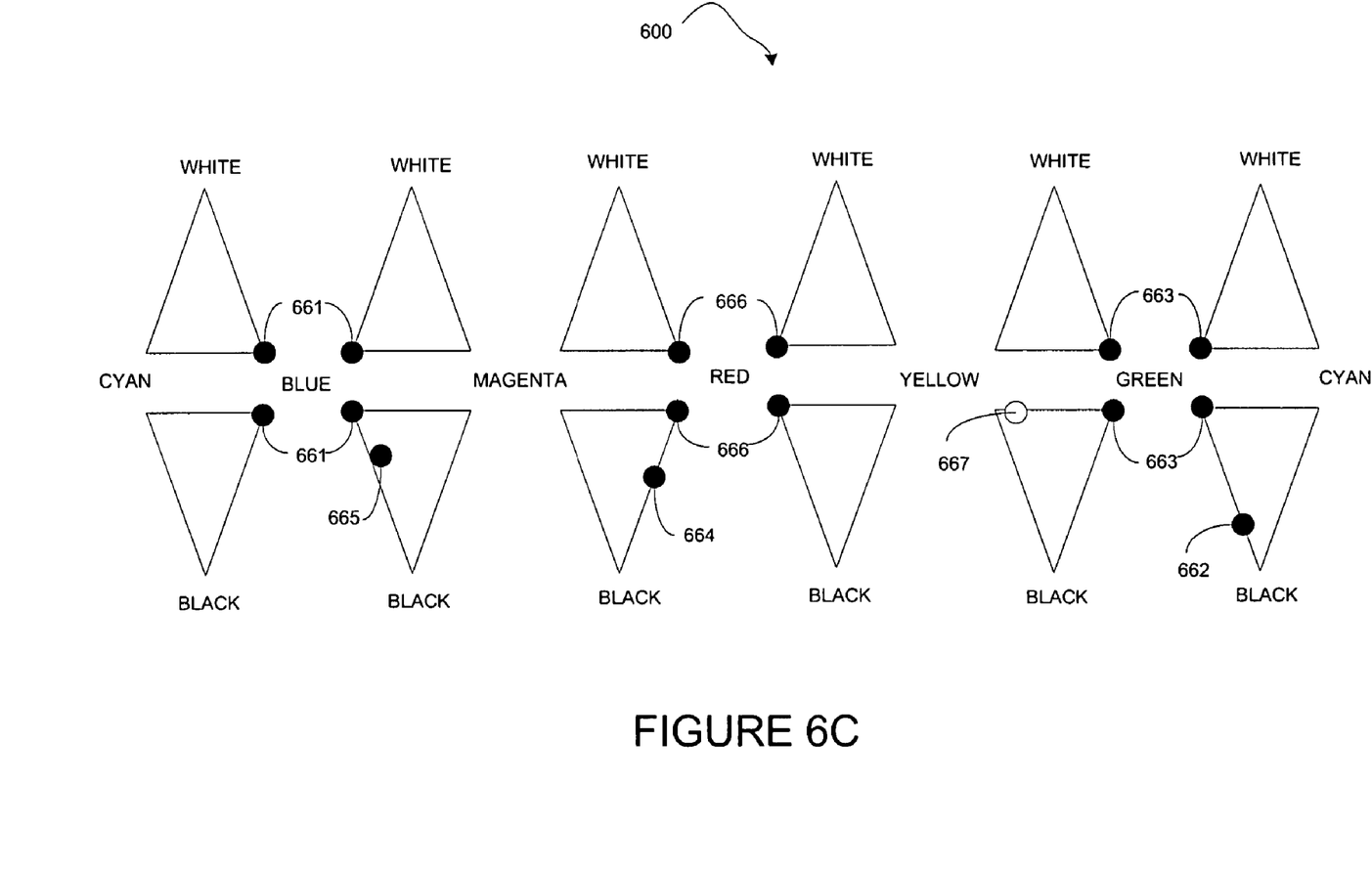

FIGS. 6A and 6B show a three-dimensional (3D) color gamut representation 600 representing all measurable colors in accordance with at least one aspect of the present invention. FIG. 6C is a two-dimensional representation of three-dimensional color gamut representation 600 representing measurable colors in accordance with at least one aspect of the present invention. Color gamut representation 600 may be produced through an application programming interface that initiates the operation of a graphics program to create and display the color gamut representation 600. In FIG. 6A, measured points are identified on the double hexagonal cone by dark points. Points that need to be obtained are identified on the double hexagonal cone by light points. In this example, all points 661-667 correspond to points identified in FIG. 5. A display may show color gamut representation 600 as a three dimensional representation to identify colorimetric points needed for measurement at the same time as a thumbnail or image of a captured scene. The two dimensional or three dimensional color gamut representation of the scene that was captured can be displayed in an immediate and interactive manner such that one can use a color measurement device to determine whether the scene colors are within any particular target device gamut, such as the magazine sheet feed press or newspaper press the user is capturing the image for. Initiation of an application programming interface may run an application that will display color gamut representation 600 simultaneously with a thumbnail or image of the captured scene or captured object.

For the 3D color gamut representation 600 shown in FIG. 6A, points 661-666 are identified by dark points and correspond to measured points 561-566 shown in FIG. 5. Point 667 is identified by a light point and corresponds to measured point 567 shown in FIG. 5. 3D color gamut representation 600 may be shown on a display, such as display 430. FIG. 6B shows the 3D color gamut representation 600 of FIG. 6A after it has been rotated 120 degrees around the lighting axis. FIG. 6B shows an illustrative example of a displayed 3D color gamut representation 600 after a request has been received to rotate the 3D color gamut representation 600 by 120 degrees around the lighting axis. As shown in FIG. 6B, all measured points and points needing to be obtained 661-667 have been rotated along with the 3D color gamut representation 600. A user can rotate 3D color gamut representation 600 to any view desired. Further, a user can change the view from a three-dimensional color gamut representation 600 as shown in FIG. 6A, to a two-dimensional color gamut representation 600 shown in FIG. 6C. Therefore, as the user 220 is at a scene 510 taking a picture, 3D color gamut representation 600 can be displayed for the user 220 to see any point that needs to be measured at that time. User 220 can then measure additional points as needed to obtain an accurate color representation of the scene. It should be understood by those skilled in the art that the color gamut representations 600 shown in FIGS. 6A-6C are but two illustrations of color gamut representation.

Figure 7:
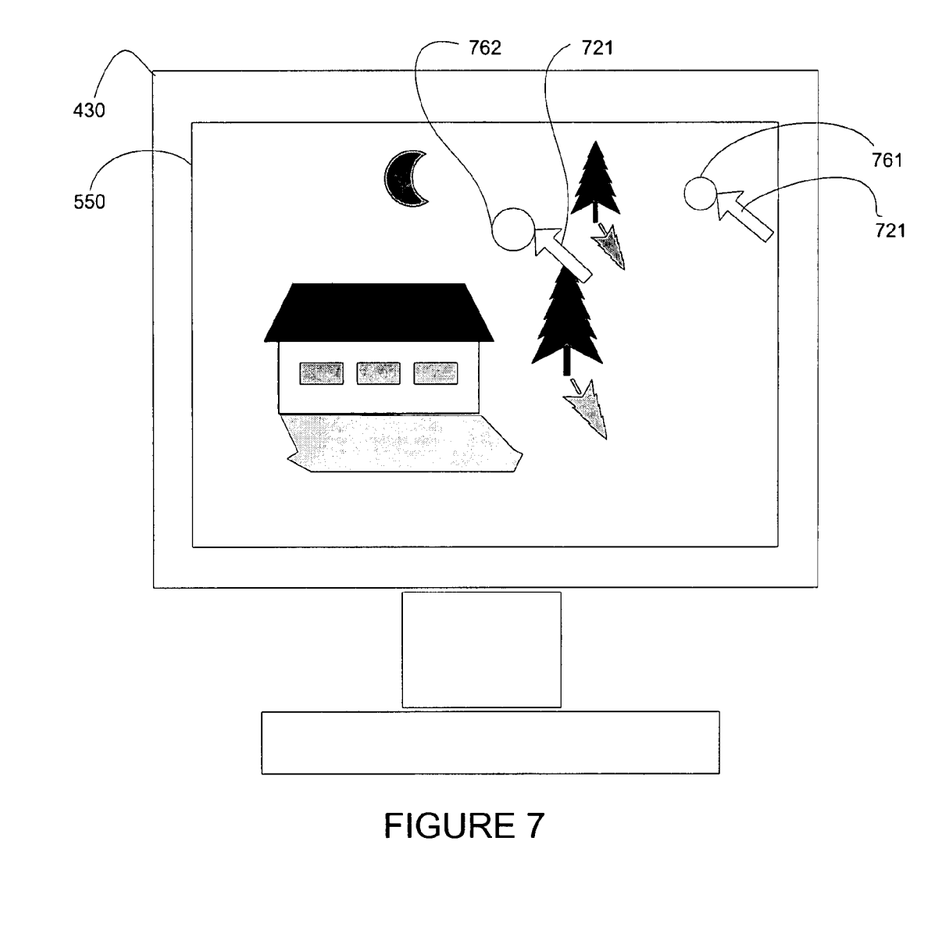
FIG. 7 shows an illustrative embodiment of a display in accordance with at least one aspect of the present invention.

FIG. 7 shows a display 430 in accordance with at least one aspect of the present invention. The display 430 shown in FIG. 7 may be a display on a camera 410. As shown, measurement point 761 is shown on image 550. User 220 can operate an input device, such as a mouse, to resize and/or reposition measured point 761. User 220 can use a pointer 721 to resize the measured point 761 and reposition the measured point 761 to measured point 762. As shown, measured point 762 is larger than measured point 761. User 220 can resize and reposition measured points into the desired location on image 550 to obtain a more accurate color representation of the scene 510.

Figure 8:
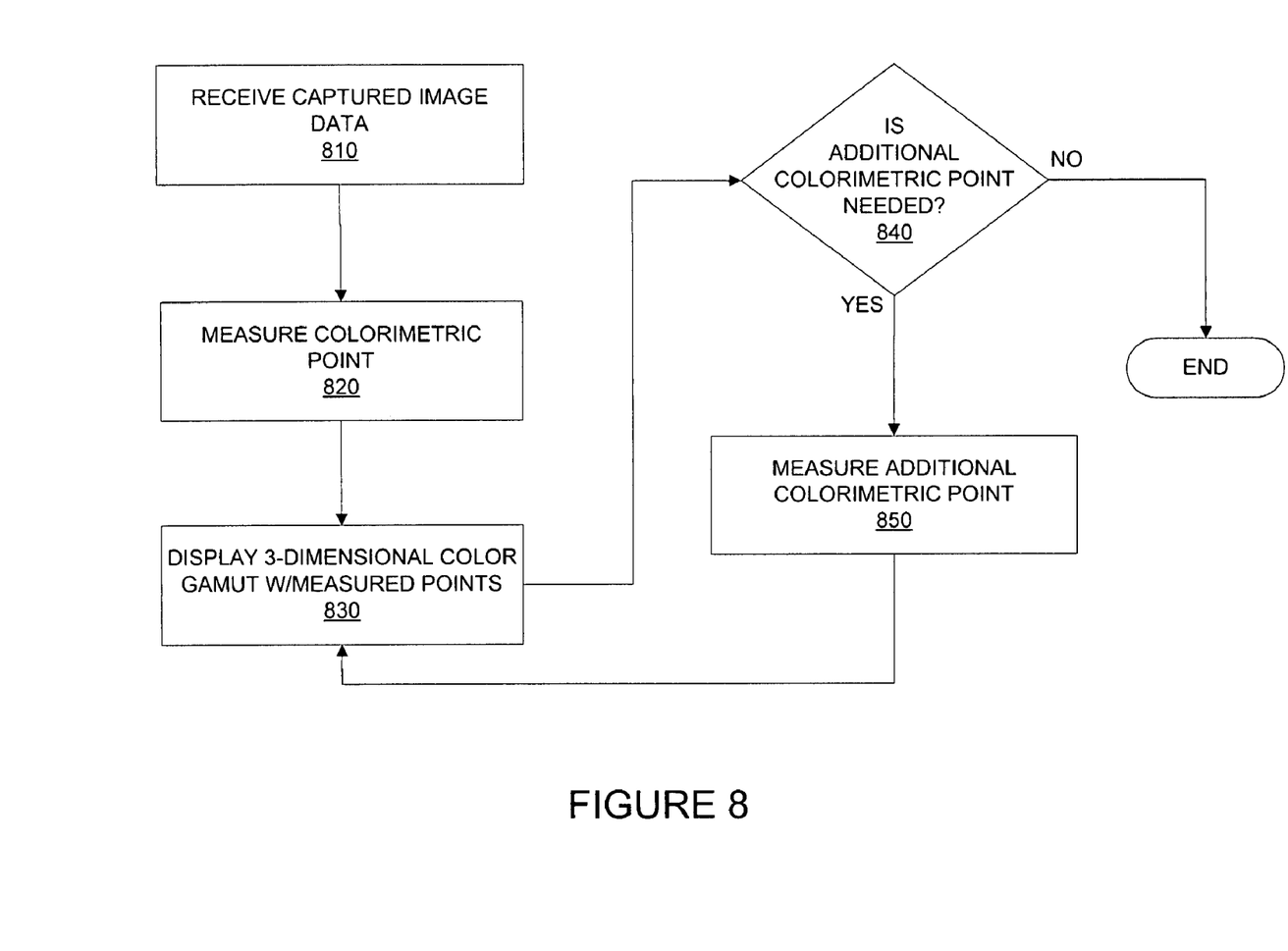
FIG. 8 is a flowchart of an illustrative embodiment of the steps to create accurate image content according to at least one aspect of the present invention.

FIG. 8 shows a flowchart showing an illustrative embodiment of the steps to create accurate image content according to at least one aspect of the present invention, which can operate in conjunction with the image content solution 400 described in FIG. 4. At step 810, captured image data is received. Captured image data may be image 415 and may be received from a digital camera, such a camera 410. At step 820, a colorimetric point for a corresponding region of the captured image data is measured. At step 830, a 3D color gamut representation, such as 3D color gamut representation 600 illustrated in FIG. 6A, is displayed with measured values identified. At step 840, a determination is made as to whether an additional colorimetric point is needed to be measured. If an additional point is needed, the additional colorimetric point is measured at step 850 and process continues again at step 830. If an additional colorimetric point is not needed, the process ends. It should be understood by those skilled in the art that any combination or all of the steps illustrated in FIG. 8 may be applied to a series of images that are captured as a motion sequence. Colorimetric points can be applied as necessary to any image or all of the series of images that are captured.

Figure 9:
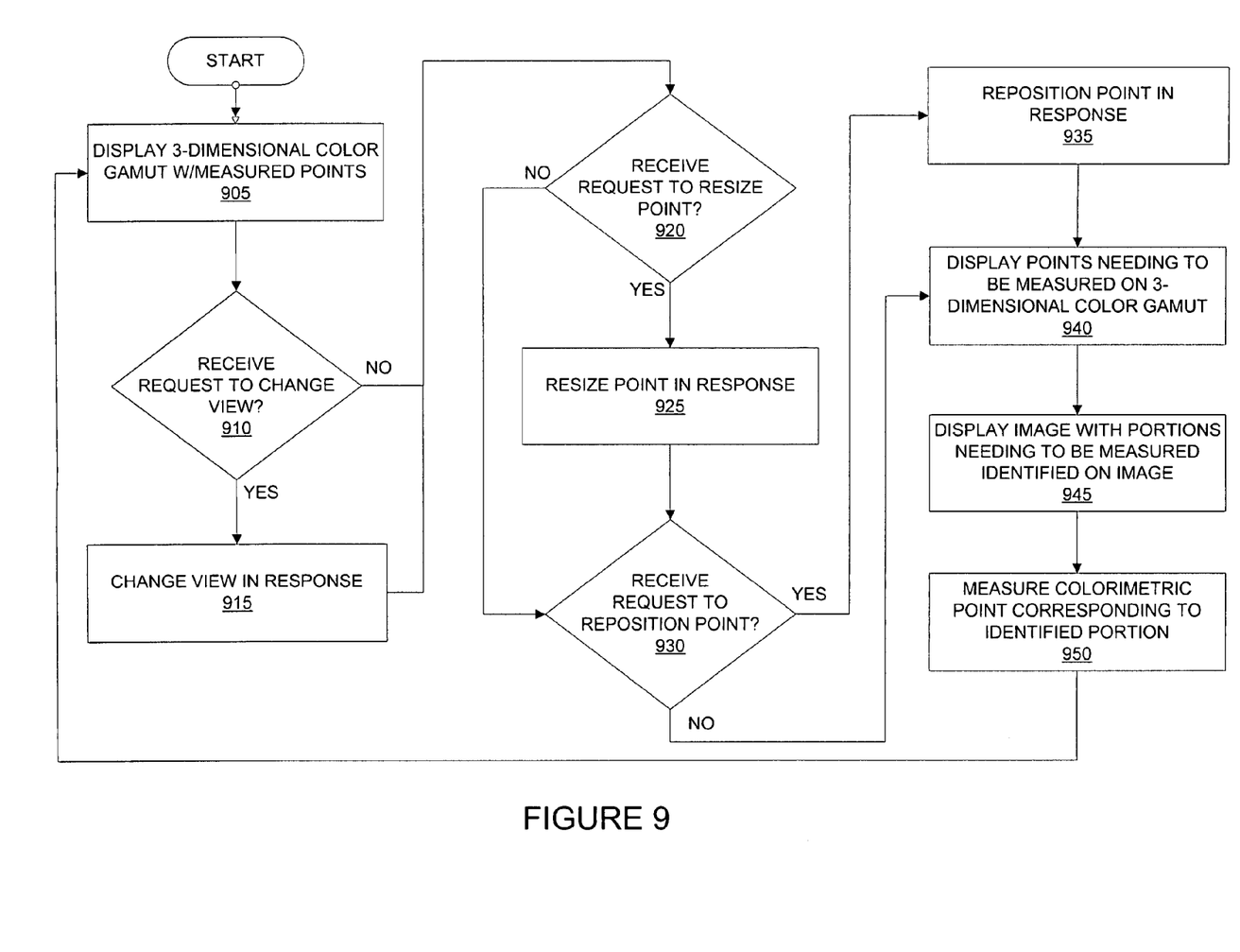
FIG. 9 is a flowchart illustrating an illustrative embodiment of the steps to allow for user interaction in creating accurate image content according to at least one aspect of the present invention.

FIG. 9 shows a flowchart showing an illustrative embodiment of the steps to allow for user interaction in creating accurate image content according to at least one aspect of the present invention, which can operate in conjunction with the image content solution 400 described in FIG. 4. At step 905, a 3D color gamut representation, such as 3D color gamut representation 600 illustrated in FIG. 6A, is displayed with measured points identified. For step 905, the points may be identified by dark points. At step 910, a determination is made as to whether a request to change the view of the 3D color gamut representation has been received. If a request to change the view of the 3D color gamut representation has been received, the process continues to step 915 where the view of the 3D color gamut representation is changed. The process then continues to step 920. If a request to change the view has not been received, the process continues at step 920. A request to change the view of the 3D color gamut representation may include rotating the 3D color gamut representation, such as the rotation shown from FIG. 6A to FIG. 6B.

At step 920, a determination is made as to whether a request to resize a measured point has been received. A request to resize a measured point may include a request to enlarge the measured point, such as the resized point shown in FIG. 7. If a request to resize a measured point is received at step 920, the measured point is resized in step 925 and the process continues to step 930. Alternatively, if a request to resize a measured point was not received at step 920, the process continues directly to step 930. At step 930, another determination is made as to whether a request to reposition a measured point has been received. A request to reposition a measured point may include a request to move the measured point, such as the repositioned point shown in FIG. 7. If a request to reposition a measured point is received at step 930, the measured point is repositioned in step 935 and the process continues to step 940. Alternatively, if a request to reposition a measured point was not received at step 930, the process continues directly to step 940.

At step 940, points needing to be measured are displayed on the 3D color gamut representation, such as point 667 identified on 3D color gamut representation 600 illustrated in FIG. 6A. Alternatively, or in addition, at step 945, the image, such as image 550, is displayed with portions needing to be measured, such as portion 567 shown in FIG. 5, identified on the image. The portions needing to be measured may be highlighted or identified in a number of different manners. At step 950, a colorimetric point corresponding to the identified portion is measured. The process then starts again at step 905. There are multiple methods for subsequent color correction of image content known in the art. Dan Magulis's *The Professional Photoshop, the Classic Guide to Color Correction*, 4$^{th}$ Ed., Wiley Publishing 2002 identifies several known color correction techniques that can occur subsequent to the present invention.

While illustrative systems and methods as described herein embodying various aspects of the present invention are shown, it will be understood by those skilled in the art, that the invention is not limited to these embodiments. Modifications may be made by those skilled in the art, particularly in light of the foregoing teachings. For example, each of the elements of the aforementioned embodiments may be utilized alone or in combination or subcombination with elements of the other embodiments. It will also be appreciated and understood that modifications may be made without departing from the true spirit and scope of the present invention. The description is thus to be regarded as illustrative instead of restrictive on the present invention.

We claim:

1. A method for creating image content, the method comprising steps of:
   receiving captured image data;
   obtaining information of a first colorimetric point;
   automatically determining whether information of a second colorimetric point needs to be obtained;
   if information of a second colorimetric point needs to be obtained, obtaining information of the second colorimetric point; and
   transforming the captured image data to an unbounded color space based on the obtained information of the first and second colorimetric points.

2. The method of claim 1, further comprising a step of storing the captured image data in an image file.

3. The method of claim 1, wherein the step of obtaining information of a first colorimetric point includes obtaining information regarding a location and a variable of the first colorimetric point.

4. The method of claim 3, wherein the obtained location information and obtained variable information are stored in at least one of: metadata of an image file and a separate file.

5. The method of claim 1, wherein the step of obtaining information of a first colorimetric point includes step of:
   obtaining a variable of the first colorimetric point; and
   obtaining location information of the first colorimetric point.

6. The method of claim 1, wherein the step of obtaining information of a first colorimetric point includes obtaining one of: a spectral highlight, an adopted white point, an adopted black point, a grey point, and a color point.

7. A method for creating image content, the method comprising steps of:
   receiving captured image data;
   obtaining information of a first colorimetric point;
   displaying an image of the captured image data with the information of the first colorimetric point identified on the image;
   displaying a color gamut representation with the information of the first colorimetric point identified on the color gamut representation;
   receiving a request to reposition the information of the first colorimetric point identified on the image;
   displaying the repositioned information of the first colorimetric point identified on the image in response;
   automatically determining whether information of a second colorimetric point needs to be obtained; and
   if information of a second colorimetric point needs to be obtained, obtaining information of the second colorimetric point.

8. The method of claim 7, further comprising steps of:
   displaying the image of the captured image data with the information of the second colorimetric point needing to be obtained identified on the image; and
   displaying the color gamut representation with the information of the second colorimetric point needing to be measured obtained on the color gamut representation.

9. The method of claim 8, wherein the identification of the information of the first colorimetric point and information of the second colorimetric point needing to be obtained are different.

10. The method of claim 7, further comprising steps of:
    receiving a request to change a view of the color gamut representation; and
    displaying the changed view of the color gamut representation in response.

11. The method of claim 7, further comprising steps of:
    receiving a request to resize the information of the first colorimetric point identified on the image; and
    displaying the resized information of the first colorimetric point identified on the image in response.

12. The method of claim 7, wherein the color gamut representation is a three-dimensional representation.

13. The method of claim 1, wherein the step of automatically determining whether information of a second colorimetric point needs to be obtained includes a step of providing an indication that the second colorimetric point needs to be obtained.

14. The method of claim 1, wherein the captured image data is part of a captured sequence of images.

15. An image content system comprising:
    a color measurement device configured to measure information of a first colorimetric point;
    an image capturing device configured to capture image data;
    a processing component, coupled to the image capturing device, configured to receive captured image data and information of the first measured colorimetric point, to display an image of the captured image data, and to associate the information of the first measured colorimetric point with a location in the displayed image; and
    wherein the processing component is further configured to store captured image data in an image file, to store measured location and variable information, and to transform captured image data to an unbounded color space based on the information of the first colorimetric point.

16. An image content system comprising:
    a color measurement device configured to measure information of a first colorimetric point;
    an image capturing device configured to capture image data;
    a processing component, coupled to the image capturing device, configured to receive captured image data and information of the first measured colorimetric point, to display an image of the captured image data, and to associate the information of the first measured colorimetric point with a location in the displayed image;

wherein the processing component is further configured to receive a request to manipulate the information of the first measured colorimetric point; and wherein the request to manipulate the information of the first measured colorimetric point includes at least one of: resizing the information of the first measured colorimetric point and repositioning the information of the first measured colorimetric point.

17. The image content system of claim 15, wherein the processing component is further configured to display a color gamut representation with the information of the first measured colorimetric point identified on the color gamut representation.

18. The image content system of claim 17, wherein the processing component is further configured to receive a request to manipulate the color gamut representation.

19. The image content system of claim 18, wherein the request to manipulate the color gamut representation includes changing a displayed view of the color gamut representation.

20. The image content system of claim 17, wherein the displayed color gamut representation is a three-dimensional representation.

21. The image content system of claim 15, wherein the image capturing device includes a display and the image capturing device and processing component are physically located within a common housing.

22. The image content system of claim 15, wherein the captured image data is part of a captured sequence of images.

23. A computer-readable medium having computer-executable instructions for creating image content, the method comprising steps of:

receiving captured image data;

receiving information of a first measured colorimetric point;

determining whether information of a second colorimetric point needs to be obtained;

if information of a second colorimetric point needs to be obtained, receiving information of a second measured colorimetric point, and transforming the captured image data to an unbounded color space based on the obtained information of the first and second colorimetric points.

24. The computer-readable medium of claim 23, further comprising steps of:

displaying an image of the captured image data with information of the first colorimetric point identified on the image; and displaying a color gamut representation with information of the first colorimetric point identified on the image.

25. A computer readable software architecture for creating an image content having instructions for causing a computer to execute a method, comprising:

receiving a captured image by at least one processing component configured to receive captured image data;

receiving information of a first colorimetric point;

wherein the processing component is further configured to store captured image data in an image file, to store measured location and variable information, and to transform captured image data to an unbounded color space based on the information of the first colorimetric point;

determining whether information of a second colorimetric point needs to be obtained;

receiving information of the second colorimetric point; and accessing the processing component through at least one application program interface.

26. The software architecture of claim 25, wherein the at least one application program interface is configured to access the at least one processing component responsive to a request.

27. A computer readable software architecture for creating an image content having instructions for causing a computer to execute a method, comprising:

receiving a captured image by at least one processing component configured to receive captured image data;

receiving information of a first colorimetric point;

wherein the processing component is further configured to receive a request to manipulate the information of the first measured colorimetric point;

wherein the request to manipulate the information of the first measured colorimetric point includes at least one of: resizing the information of the first measured colorimetric point and repositioning the information of the first measured colorimetric point determining whether information of a second colorimetric point needs to be obtained;

receiving information of the second colorimetric point; and access the processing component through at least one application program interface.

* * * * *